(12) United States Patent
Zhang et al.

(10) Patent No.: US 10,601,197 B2
(45) Date of Patent: Mar. 24, 2020

(54) FEMTOSECOND LASER OSCILLATOR

(71) Applicant: DAHENG NEW EPOCH TECHNOLOGY INC., Beijing (CN)

(72) Inventors: Yi Zhang, Beijing (CN); Meng Liu, Beijing (CN); Haitao Fan, Beijing (CN); Siyi Yao, Beijing (CN)

(73) Assignee: DAHENG NEW EPOCH TECHNOLOGY INC., Beijing (CN)

( * ) Notice: Subject to any disclaimer, the term of this patent is extended or adjusted under 35 U.S.C. 154(b) by 0 days.

(21) Appl. No.: 16/084,978

(22) PCT Filed: Jul. 8, 2016

(86) PCT No.: PCT/CN2016/089385
§ 371 (c)(1),
(2) Date: Sep. 14, 2018

(87) PCT Pub. No.: WO2017/156935
PCT Pub. Date: Sep. 21, 2017

(65) Prior Publication Data
US 2019/0089122 A1 Mar. 21, 2019

(30) Foreign Application Priority Data
Mar. 14, 2016 (CN) .......................... 2016 1 0141305

(51) Int. Cl.
*H01S 3/11* (2006.01)
*H01S 3/094* (2006.01)
(Continued)

(52) U.S. Cl.
CPC ............ *H01S 3/1109* (2013.01); *H01S 3/094* (2013.01); *H01S 3/105* (2013.01);
(Continued)

(58) Field of Classification Search
CPC ...... H01S 3/1625; H01S 3/1106; H01S 3/094; H01S 3/1636; H01S 3/1109; H01S 3/1112
See application file for complete search history.

(56) References Cited

U.S. PATENT DOCUMENTS 5,383,198 A * 1/1995 Pelouch ................ H01S 3/1112
372/18
5,818,626 A * 10/1998 Engstrom ............... G02F 1/093
359/281
(Continued)

FOREIGN PATENT DOCUMENTS

CN 1085016 A 4/1994
CN 201188500 Y 1/2009
(Continued)

*Primary Examiner* — Michael Carter
(74) *Attorney, Agent, or Firm* — Bayramoglu Law Offices LLC

(57) ABSTRACT

A femtosecond laser oscillator includes a 532 nm pump laser light, a Ti-doped sapphire, a laser resonator, and a dispersion compensation element, etc. The 532 nm pump laser light is radiated via a pump laser light guide device to the Ti-doped sapphire and generates stimulated radiation, the stimulated radiation light oscillates back and forth in the laser resonator and thereby is amplified, and continuous light is outputted. The dispersion compensation element is disposed in the resonator to compensate the dispersion of the outputted laser light resulted from oscillation of the laser light in the resonator to attain a mode locking condition. The mode locking means of the laser against disturbance is implemented in a form of return light outside the resonator, specifically, the emitted continuous light is returned to a femtosecond laser partially and thereby mode locking is achieved, and output of femtosecond pulses is realized.

16 Claims, 2 Drawing Sheets

(51) Int. Cl.
*H01S 3/105* (2006.01)
*H01S 3/10* (2006.01)
H01S 3/16 (2006.01)

(52) U.S. Cl.
CPC ........ *H01S 3/10092* (2013.01); *H01S 3/1112* (2013.01); *H01S 3/1625* (2013.01); *H01S 3/1636* (2013.01)

(56) References Cited

U.S. PATENT DOCUMENTS

| | | | | |
|---|---|---|---|---|
| 6,618,423 | B1* | 9/2003 | Dekorsy | H01S 3/1112 372/18 |
| 7,835,065 | B2* | 11/2010 | Almoric | G01B 11/272 359/326 |

FOREIGN PATENT DOCUMENTS

| | | | |
|---|---|---|---|
| CN | 101854022 | A | 10/2010 |
| CN | 103531999 | A | 1/2014 |
| CN | 103972779 | A | 8/2014 |
| CN | 105576491 | A | 5/2016 |
| JP | 2007129210 | A | 5/2007 |

\* cited by examiner

FEMTOSECOND LASER OSCILLATOR

CROSS REFERENCE TO RELATED APPLICATIONS

This application is the national phase entry of International Application PCT/CN2016/089385, filed on Jul. 8, 2016 which is based upon and claims priority to Chinese Patent Application No. 201610141305.3, filed on Mar. 14, 2016 the entire contents of which are incorporated herein by reference.

FIELD OF THE INVENTION

The present invention belongs to the field of ultrafast laser, and relates to a Ti sapphire femtosecond laser.

BACKGROUND OF THE INVENTION

Femtosecond laser is one of the most powerful new tools developed on the basis of laser science in the past 20 years. Femtosecond pulses are so short that they are within 4 fs presently. One femtosecond (fs) (i.e., $10^{-15}$ s) is one quadrillionth of second; if 10 fs is used as a geometric mean to measure the universe, the life of the universe is only 1 min.; femtosecond pulses are so strong that the maximum pulse peak power obtained with a multi-stage chirped pulse amplification (CPA) technique may be at the order of hundreds of terawatts (TW, i.e., $10^{12}$ W) or even patawatts (PW, i.e., $10^{15}$ W) and their focusable intensity is higher that the energy intensity of all light radiated from the sun to the earth after the light is focused to a point as small as a pinpoint. Femtosecond laser is absolutely a miracle created by human.

In the last 20 years, lasers have been developed from dye lasers to Ti sapphire femtosecond lasers that are mode-locked by means of a Kerr lens, and then to diode pumped all-solid-state femtosecond lasers and femtosecond optical fiber lasers. Notwithstanding that the records of pulse width and energy have been broken continuously, the greatest advancement is that it becomes very easy to obtain ultrafast femtosecond pulses. R. Trebino from Sandia National Laboratories said, "In the past 10 years, the (ultrafast) technique has been improved significantly, and Ti sapphire lasers and today's optical fiber lasers are making the operation of such (femtosecond) lasers simple and stable. Such lasers are commercially available now, but you had to set up them by yourself ten years ago."

Based on the ultra-short and ultra-strong characteristics of femtosecond laser light, researches in the applied research domain may be generally classified into researches on ultrafast transient phenomena and researches on ultra-strong phenomena. Both types of researches are deepened and developed continuously as the laser pulse width is decreased and the pulse energy is increased. The most direct application of femtosecond pulse lasers is light sources for various time resolved spectroscopy techniques and pumping/probing techniques. The development of femtosecond pulse laser has directly driven the researches in physics, chemistry, biology, material science and information science into the domain of microscopic ultrafast processes, and has opened some fire-new research domains, such as femtosecond chemistry, quantum control chemistry, and coherent spectroscopy of semiconductors, etc. Utilizing femtosecond pulsed laser and nanoscopy in combination, people can explore the carrier dynamics in the nanostructures (quantum wires, quantum dots, and nanocrystals) of semiconductors. In the aspect of biology, people are utilizing differential absorption adsorption spectroscopy and pumping/probing techniques provided on the basis of femtosecond laser technology to explore the energy transfer, energy conversion, and charge separation processes in reaction centers of photosynthesis. Ultra-short pulse laser is further applied for information transmission, processing, and storage.

The first desktop TW laser implemented with a chirped pulse amplification technique successfully started to operate in 1988, marking the researches on femtosecond ultra-strong and ultra-high-density light in laboratories. In the researches in that domain, since the effect of the ultra-short laser field is equivalent to or greatly stronger than the effect of the binding field suffered by the electrons in atoms, the perturbation theory is not true anymore, and a new theory has to be developed. At the order of $10^{20}$ W/cm$^2$ light intensity, researches on simulated astrophysical phenomena can be made. Thermoelectrons (200 keV<E<1 MEV) produced under ultra-strong laser light at $10^{19}$-$10^{21}$ W/cm$^2$ light intensity can heat up a large quantity of ions and thereby initiate nuclear fusion. The final implementation of the concept of fast ignition for inertial confined fusion (ICF) will make inestimable contribution to national security and energy utilization.

Another important application of femtosecond lasers is micro-fine processing. Generally, according to the laser pulse standard, laser pulses with duration longer than 10 picoseconds (equivalent to the heat conduction time) belong to long pulses. If such laser pulses are used to process materials, the processing accuracy will be degraded because the thermal effect causes changes of the adjacent material. In contrast, femtosecond laser pulses, which have pulse width as small as one trillionth second, have unique material processing characteristics, for example, the fused area of a processed hole is very small or even doesn't exist; micro-machining or micro-engraving in a variety of materials, such as metal materials, semiconductor materials, transparent materials, or even biological tissues, etc., can be realized; the processed area may be smaller than the focus size, and the diffraction limit can be breached, etc. Some automobile manufacturers and heavy equipment fabricators are making research on how to utilize femtosecond laser to process fuel injection nozzles of engines better. Pinholes in width as small as hundreds of nanometers can be formed in metal materials with ultra-short pulse laser light. In the meeting of Optical Society of America (OSA) held in Orlando lately, Hayter from IBM Corporation said that IBM had applied a femtosecond laser system in the photolithographic process of large scale integrated circuit (LSIC) chips. There is little or no heat transfer when femtosecond laser light is used for cutting. Researchers of Lawrence Livermore National Laboratory (LLNL) found that such laser beams could be used to cut high explosives safely. Laszk from LLNL said, "Femtosecond laser is expected to be a cold processing tool to defuse decommissioned rockets, artillery shells, and other weapons." Femtosecond laser light can be used to cut fragile polymeric materials without changing important biochemical characteristics of the polymeric materials. Biomedical experts have used femtosecond laser light as an ultra-precision surgical knife for vision correction operations. Utilizing femtosecond laser light as a surgical knife can reduce tissue damages and void postoperative sequelae, and even allows precision operation to a single cell or gene therapy. Presently, people are make research on how to apply femtosecond laser in dental treatments. Some scientists have found that a small part of a tooth can be removed with ultrashort pulse laser light without affecting the peripheral substances. It is believed that femtosecond laser will be applied more widely in more domains as ultra-short pulse laser techniques are developed further and high-reliability commercial femtosecond lasers are further improved.

At present, lasers that are used the most commonly are Ti-sapphire femtosecond lasers. The main principle of those lasers is the self-mode-locking effect of Ti-doped sapphire. The self-mode-locking phenomenon of Ti-doped sapphire laser was found by Spence et al. in Scotland in 1990. The emergence of that technique opened a fire-new page of research on ultra-short pulse laser. Different from the traditional active mode locking and passive mode-locking, for some laser oscillators that contain a medium with strong Kerr effect, with a specific oscillator structure, stable mode-locked operation can be realized without any additional modulation or saturable absorber. The combination of such a simple structure and Ti-doped sapphire laser with ultra-wide tunable bandwidth has become a main trend of development of ultra-short pulse lasers now, and has directly produced light pulses shorter than 5 fs. At present, it is universally accepted that the basic principle of the mode locking technique lies in the Kerr effect formed by a solid gain medium under strong focal pumping. It is well-known that the refractivity of a medium as a result of the Kerr effect under the action of nonhomogeneous light may be expressed by the following formula:

$$n(r)=n_0+n_2I(r)$$

Where, $n_0$ is static refractivity independent of light intensity, $n_2$ is Kerr coefficient, $I(r)$ is light intensity distribution. Thus, under the action of pump light and oscillating light, the distribution of refractivity of the medium will change in the radial direction, and the gain medium will be equivalent to a self-focusing lens. When the oscillating laser light passes through the medium, stronger light and weaker light exhibit two different focusing modes, and they exhibit different light beam sizes at different places in the resonator. On that basis, if a hard edge diaphragm in appropriate size is added at a place in the resonator in a way that the transmitted light beam resulted from strong focusing of the stronger light right passes through the diaphragm while the transmitted light beam resulted from weak focusing of the weaker light can't pass through the diaphragm, the system will be equivalent to a fast saturable absorber, and a stable self-mode-locking process will be established when the laser light reaches dynamic balance after multiple times of to-and-fro oscillation. The result of further research has proved: with a certain oscillator structure, relative distribution of pump light-oscillating light similar to the case of a diaphragm also exists in laser crystals that have a self-focusing effect. Such a mechanism usually is also referred to as soft edge diaphragm. With the soft edge diaphragm technique, the structure of a self-mode-locking laser is simpler, and the mode locking adjustment is more convenient.

At present, all common mode locking techniques are implemented in the oscillator, by inserting an acoustooptic modulator in the oscillator, or pushing lenses or prisms in the oscillator, or inserting a diaphragm in the oscillator. Since all of the mode locking techniques are implemented in the resonator regardless of the specific implementation scheme, they may cause instability of the resonator or introduce loss or dispersion into the resonator, and consequently cause degraded stability of the pulse width or output of the femtosecond laser light. In view of the above problems, the present invention provides a femtosecond laser, which utilizes an innovative mode locking device to improve the stability of femtosecond laser and shorten pulse width.

SUMMARY OF THE INVENTION

To overcome the drawbacks of existing mode locking devices of Ti-sapphire femtosecond lasers, the present invention provides an innovative mode locking device, which can improve the stability of femtosecond lasers and shorten the pulse width. The femtosecond laser oscillator provided in the present invention comprises a 532 nm pump laser, a Ti-doped sapphire, a laser resonator, and a dispersion compensation element, etc., wherein, 532 nm pump light is radiated via a pump light guide device to the Ti-doped sapphire and generates stimulated radiation, the stimulated radiation light oscillates to and fro in the laser resonator and thereby is amplified, and continuous light is outputted; the dispersion compensation element is disposed in the resonator to compensate the dispersion of the outputted laser light resulted from oscillation of the laser light in the resonator to attain a mode locking condition, wherein the mode locking means of the laser against disturbance is implemented in a form of return light outside the resonator, specifically, the emitted continuous light is reflected back to a femtosecond laser partially and thereby mode locking is achieved, and output of femtosecond pulses is realized.

The return light outside the resonator may be realized by means of mirror reflection, the light reflection point can be adjusted easily, and the entire device may be placed away from the outlet of laser.

The return light outside the resonator may be realized by means of diffused reflection, the entire device may be placed at the outlet of the laser, and the entire device essentially doesn't require any adjusting device to return the light to the outputted light.

The return light outside the resonator may be realized by means of reflection from a dielectric film reflector, the ratio of return light may be selected by selecting the dielectric film, so as to improve the probability of mode locking.

Wherein, the light return device outside the resonator is disposed on a translation stage, and whether to return the light may be controlled by moving the translation stage.

Wherein, the light return device outside the resonator is disposed on a rotary stage, and whether to return the light may be controlled by rotating the rotary stage. Wherein, the dispersion compensation element may be a pair of prisms in height greater than the height of the entire laser resonator, the outputted femtosecond laser light is returned to the resonator in the original path via a beam steerer after mode locking, and passes through the pair of prisms again for dispersion compensation. In that way, the femtosecond laser light can be compressed again.

Finally, since the movable mode locking device is disposed externally, all elements of the femtosecond laser oscillator may be fixed in a permanently fixed manner, so as to improve the stability of the femtosecond laser.

Compared with the prior art, the present invention has the following advantages: Firstly, since the mode locking device is disposed outside the resonator, movable elements in the resonator can be reduced, and the stability of the resonator can be improved; in addition, compared with mode locking implemented by means of acoustooptic modulation, no additional component has to be inserted in the resonator, and thereby dispersion in the resonator can be reduced, and the pulse width of the femtosecond laser light can be further compressed. Besides, remote mode locking can be realized by returning the light by means of mirror reflection; mode locking can be realized simply and the success ratio of mode locking can be improved by returning the light by means of diffused reflection; the success ratio of mode locking can be improved during remote mode locking by utilizing a dielectric film reflector for mode locking;

Secondly, automation of the mode locking device can be realized by utilizing the translation stage to move the mode locking device or utilizing the rotary stage to rotate the mode locking device; since there is no movable device in the resonator any more, all lenses can be fixed in a permanently fixed manner, and thereby the stability of the laser can be greatly improved.

Finally, with the special design of the dispersion compensation device, the utilization efficiency of the dispersion compensation device can be improved, and the pulse width of the femtosecond laser light can be further compressed.

In summary, the femtosecond laser provided in the present invention has higher stability and shorter pulse width, and is of great significance for wide application of femtosecond lasers.

BRIEF DESCRIPTION OF DRAWINGS

101—532 nm pump laser; 102—pump light reflector; 103—focusing lens; 104—concave reflector; 105—titanium-doped sapphire; 106—concave reflector; 107—dispersion compensating prism; 108—planar reflector; 109—planar reflector; 110—planar reflector; 111—dispersion compensating prism; 112—output mirror; 113—frosted glass; 114—back end mirror

201—external mode locking device on translation stage

Figure 3:
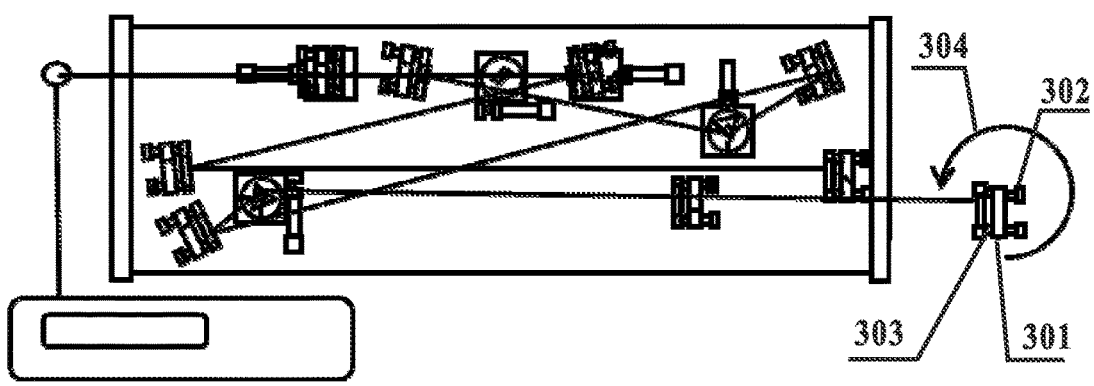

FIG. 3 is a schematic diagram of an external mode locking device disposed on a rotary stage;

301—external mode locking device on rotary stage

Figure 4:
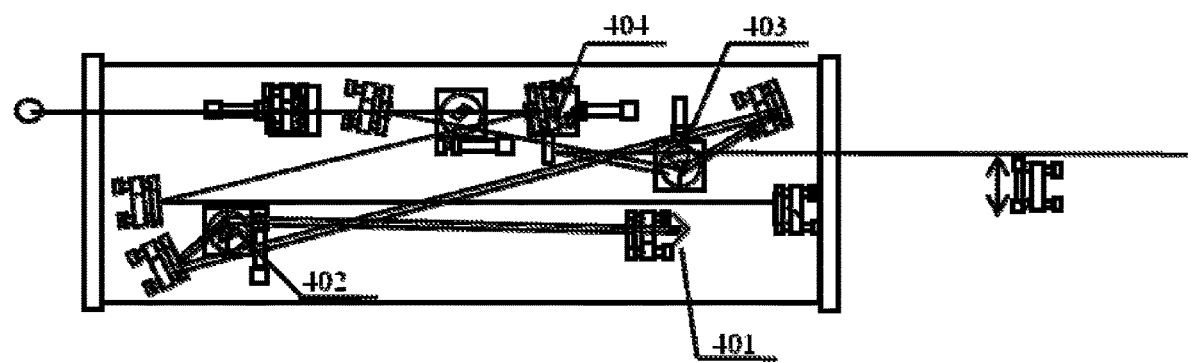

FIG. 4 is a schematic diagram of a femtosecond laser oscillator with a twice dispersion compensation device;

401—beam steerer; 402—dispersion compensating prism; 403—dispersion compensating prism; 404—planar reflector

DETAILED DESCRIPTION OF THE EMBODIMENTS

Hereunder the present invention will be further detailed in embodiments, with reference to the accompanying drawings.

Embodiment 1

Figure 1:
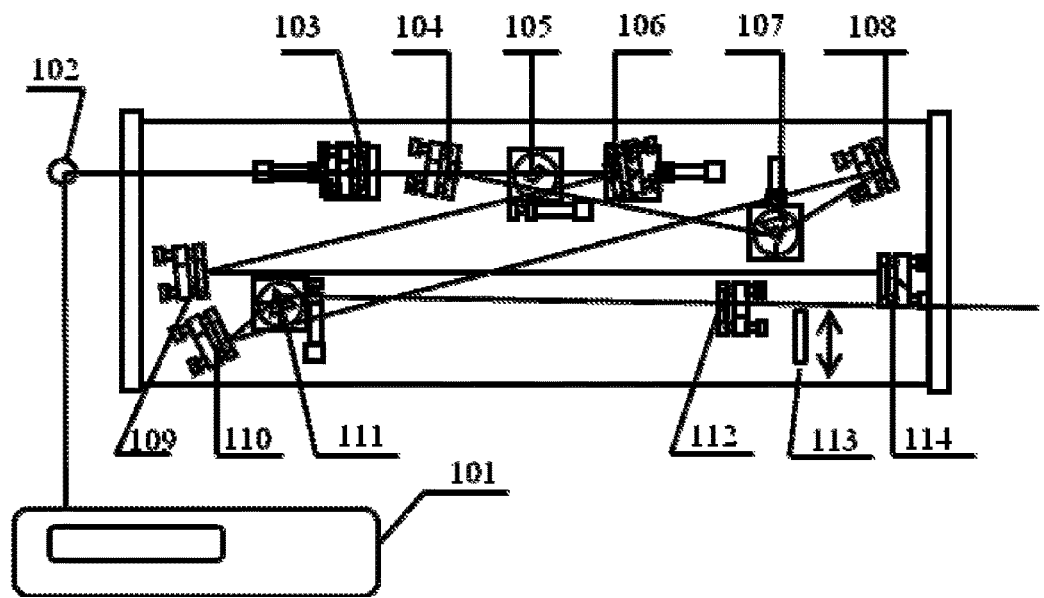
FIG. 1 is a schematic diagram of a femtosecond laser oscillator.

A femtosecond laser oscillator is shown in FIG. 1, wherein, 532 nm laser light outputted from a 532 nm pump laser 101 is reflected by a pump light reflector 102 and then focused by a focusing lens 103 into a laser resonator to pump a titanium-doped sapphire 105, one part of the spontaneous light emitted from the titanium-doped sapphire 105 is reflected by a concave reflector 106 and a reflector 105 to a back end mirror 114; the other part of the spontaneous light is reflected by a concave reflector 104, passes through a dispersion compensating prism 107, is reflected by a reflector 108 and a reflector 110, passes through a dispersion compensating prism 111, and reaches to an output mirror 112. The attitudes of the output mirror 112 and the back end mirror 114 are adjusted carefully to realize continuous output of 800 nm light, and the positions of the dispersion compensating prisms 107 and 111 are adjusted carefully to fully compensate the dispersion of the continuous light resulted from oscillation in the resonator. Here, a piece of frosted glass 113 is inserted in the light path of laser light output, so that the outputted laser light is reflected partially to the laser resonator and thereby mode locking is realized.

Embodiment 2

Figure 2:
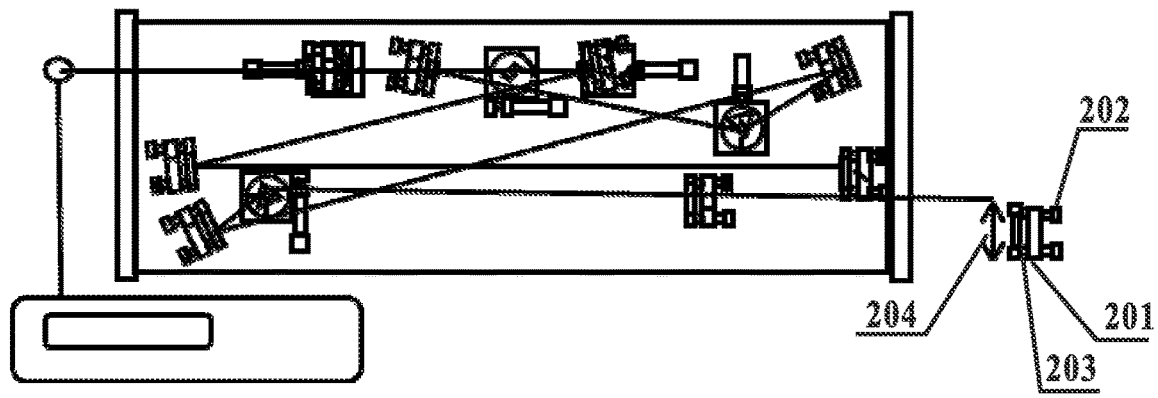
FIG. 2 is a schematic diagram of an external mode locking device disposed on a translation stage.

FIG. 2 is a schematic diagram of an external mode locking device disposed on a translation stage; the external mode locking device 201 on the translation stage consists of reflector 202, a reflector bracket 203, and a translation stage 204. The device can be disposed outside the entire laser, the light reflected on the reflector can be partially returned to the laser resonator by adjusting the reflector bracket, and thereby mode locking can be realized. The reflector may be inserted into or moved away from the outputted light beam by moving the translation stage, so as to realize output of mode-locked light. Alternatively, the translation stage may be a motor-driven translation stage, and thereby the mode locking device may be controlled electrically.

Embodiment 3

FIG. 3 is a schematic diagram of an external mode locking device disposed on a rotary stage; the external mode locking device 301 on the rotary stage consists of reflector 302, a reflector bracket 303, and a rotary stage 304. Different from the embodiment 2, the reflector may be inserted into or moved away from the output light beam by rotating the reflector, so as to realize output of mode-locked light. Alternatively, the rotary stage may be a motor-driven rotary stage, and thereby the mode locking device may be controlled electrically.

Embodiment 4

FIG. 4 is a schematic diagram of a femtosecond laser oscillator with a twice dispersion compensation device; the laser light outputted through the output lens is returned from the resonator via a beam steerer 401, passes through dispersion compensating prisms 402 and 403, and then reflected out of the laser resonator by a reflector 404, so that the laser light is outputted. In that way, the dispersion prisms may be utilized twice, and the outputted laser light can have certain negative dispersion, and thereby can be used conveniently.

While the present inventions are described above exemplarily in some embodiments, those skilled in the art should appreciate that various alternations and modifications can be made on the basis of the disclosure in the present invention, and all of such alternations and modifications shall be deemed as falling in the spirit and scope of the present invention.

What is claimed is:

1. A femtosecond laser oscillator, comprising a pump laser light with a wavelength of 532 nm, a Ti-doped sapphire, a laser resonator, and a dispersion compensation element, wherein, the pump laser light is radiated into the Ti-doped sapphire via a pump laser light guide device to generate a stimulated radiation;

laser light of the stimulated radiation oscillates back and forth in the laser resonator and thereby is amplified, and continuous laser light is outputted;

the dispersion compensation element is disposed in the laser resonator to compensate a dispersion of outputted laser light resulted from an oscillation of the laser light in the laser resonator to attain a mode locking condition, wherein an external mode locking device is disposed outside the laser resonator, wherein, the dispersion compensation element is a pair of prisms and a height of the pair of prisms is greater than a height of the laser resonator, outputted femtosecond laser light is returned to the laser resonator in an original path via a beam steerer after a mode locking, and passes through the pair of prisms again for a dispersion compensation.

2. The femtosecond laser oscillator according to claim 1, wherein, a return light outside the laser resonator is realized by a light return device consisting of a mirror reflection, a diffused reflection or a dielectric film reflector.

3. The femtosecond laser oscillator according claim 2, wherein, the light return device outside the laser resonator is disposed on a translation stage.

4. The femtosecond laser oscillator according to claim 2, wherein, the light return device outside the laser resonator is disposed on a rotary stage.

5. The femtosecond laser oscillator according to claim 2, wherein, all elements of the femtosecond laser oscillator are fixed in a permanently fixed manner.

6. The femtosecond laser oscillator according to claim 1, wherein, a return light outside the laser resonator is realized by a light return device consisting a diffused reflection.

7. The femtosecond laser oscillator according claim 6, wherein, the light return device outside the laser resonator is disposed on a translation stage.

8. The femtosecond laser oscillator according to claim 6, wherein, the light return device outside the laser resonator is disposed on a rotary stage.

9. The femtosecond laser oscillator according to claim 6, wherein, all elements of the femtosecond laser oscillator are fixed in a permanently fixed manner.

10. The femtosecond laser oscillator according to claim 1, wherein, a return light outside the laser resonator is realized by a light return device consisting a reflection from a dielectric film reflector.

11. The femtosecond laser oscillator according claim 10, wherein, the light return device outside the laser resonator is disposed on a translation stage.

12. The femtosecond laser oscillator according to claim 10, wherein, the light return device outside the laser resonator is disposed on a rotary stage.

13. The femtosecond laser oscillator according to claim 10, wherein, all elements of the femtosecond laser oscillator are fixed in a permanently fixed manner.

14. The femtosecond laser oscillator according claim 1, wherein, a light return device outside the laser resonator is disposed on a translation stage.

15. The femtosecond laser oscillator according to claim 1, wherein, a light return device outside the laser resonator is disposed on a rotary stage.

16. The femtosecond laser oscillator according to claim 1, wherein, all elements of the femtosecond laser oscillator are fixed in a permanently fixed manner.

* * * * *